United States Patent [19]
Doty et al.

[11] Patent Number: 5,520,350
[45] Date of Patent: May 28, 1996

[54] SEAT BELT RETRACTOR HAVING AN INTENTIONAL SET COMFORT SYSTEM

[75] Inventors: Gerald A. Doty; William G. Drinane, both of Auburn Hills, Mich.

[73] Assignee: Takata Inc., Auburn Hills, Mich.

[21] Appl. No.: 199,837

[22] Filed: Feb. 22, 1994

[51] Int. Cl.⁶ ............................................. B60R 22/34
[52] U.S. Cl. ............................................. 242/385.3
[58] Field of Search ........................ 242/385.3, 385.1, 242/385.2; 280/803, 807; 297/475–478

[56] References Cited

U.S. PATENT DOCUMENTS

| | | |
|---|---|---|
| Re. 33,679 | 9/1991 | Schmidt . |
| 3,700,184 | 10/1972 | Francis . |
| 3,834,646 | 9/1974 | Heath . |
| 3,851,836 | 12/1974 | Sprecher . |
| 3,869,098 | 3/1975 | Sprecher . |
| 4,026,494 | 5/1977 | Tanaka . |
| 4,065,072 | 12/1977 | Magyar . |
| 4,081,153 | 3/1978 | Tanaka et al. . |
| 4,108,393 | 8/1978 | Henderson . |
| 4,113,200 | 9/1978 | Tanaka . |
| 4,113,201 | 9/1978 | Ziv . |
| 4,120,467 | 10/1978 | Stephenson . |
| 4,123,013 | 10/1978 | Bottrill et al. . |
| 4,126,282 | 11/1978 | Morita et al. . |
| 4,162,772 | 7/1979 | Shimogawa et al. . |
| 4,165,844 | 8/1979 | Tanaka . |
| 4,205,807 | 6/1980 | Shimogawa et al. . |
| 4,212,435 | 7/1980 | Kawaharazaki . |
| 4,213,580 | 7/1980 | Kawaharazaki et al. . |
| 4,241,938 | 12/1980 | Patel et al. ................ 242/385.3 X |
| 4,293,310 | 10/1981 | Ziv . |
| 4,303,208 | 12/1981 | Tanaka . |
| 4,342,435 | 8/1982 | Yanagihara . |
| 4,382,563 | 5/1983 | Morita et al. . |
| 4,383,658 | 5/1983 | Mortia et al. . |
| 4,386,745 | 6/1983 | Patel et al. . |
| 4,452,470 | 6/1984 | Doty ........................... 280/802 |
| 4,461,493 | 7/1984 | Doty ........................... 280/807 |
| 4,483,494 | 11/1984 | Takada . |
| 4,498,642 | 2/1985 | Doty . |
| 4,498,689 | 2/1985 | Duffield et al. .............. 280/803 |
| 4,553,716 | 11/1985 | Honl . |
| 4,564,153 | 1/1986 | Morinaga et al. . |
| 4,568,037 | 2/1986 | Kawaguchi . |
| 4,585,185 | 4/1986 | Ueda . |
| 4,592,520 | 6/1986 | Kawaguchi . |
| 4,603,877 | 8/1986 | Espinoza et al. .............. 280/807 |
| 4,669,751 | 6/1987 | Unger ......................... 280/807 |

(List continued on next page.)

Primary Examiner—John M. Jillions
Attorney, Agent, or Firm—Fitch, Even, Tabin & Flannery

[57] ABSTRACT

The present invention provides an intentionally set or overt comfort system to be employed in a vehicle seat belt retractor for rewinding a seat belt. The system requires an overt activation by the occupant through a predetermined sequence of deliberate belt manipulations for activating the intentional set comfort system and subsequently actuating the tension-relieving mode. The preferred intentional set comfort system comprises primarily two major components which include a belt sensing activation mechanism and a tension-relieving mechanism. The belt sensing mechanism senses a deliberate protraction of the belt beyond a distance of normal occupant use for shifting the tension-relieving mechanism to an activated state. In response to the belt sensing activation mechanism, an actuator arm shifts the tension-relieving mechanism to its activated state. The tension-relieving mechanism includes a disc, having a plurality of grooves, mounted for rotation with the reel shaft and a spring biased blocking finger mounted for pivotal movement that is initially spaced from the disc. Upon activation of the tension-relieving mechanism, the finger is moved into the grooves and cooperates with the grooves to initially remove belt slack. In order to actuate the tension-relieving mode, the occupant, subsequent to removal of the belt slack, makes a slight protraction of the belt to cause the tension-relieving mode. However, belt protraction beyond the predetermined distance will result in automatic disengagement of the belt from the tension-relieving state and thereby causing reversion to the tension mode under the retraction spring force.

8 Claims, 6 Drawing Sheets

U.S. PATENT DOCUMENTS

| | | |
|---|---|---|
| 4,749,142 | 6/1988 | Saitow . |
| 4,854,522 | 8/1989 | Brown et al. . |
| 4,896,843 | 1/1990 | Gray et al. ............................ 242/385.3 |
| 4,896,844 | 1/1990 | Gavagan et al. ................. 242/385.2 X |
| 4,907,757 | 3/1990 | Rumpf et al. . |
| 4,913,372 | 4/1990 | Takada . |
| 4,919,450 | 4/1990 | Doty et al. ............................... 280/803 |
| 4,943,011 | 7/1990 | Kitamura et al. . |
| 4,976,474 | 12/1990 | Doty et al. . |
| 4,993,657 | 2/1991 | Brown . |
| 5,022,601 | 6/1991 | Saitou et al. . |
| 5,037,038 | 8/1991 | Zygutis et al. . |
| 5,065,954 | 11/1991 | Cotter ................................ 242/385.3 X |
| 5,121,887 | 6/1992 | Schmidt et al. ................. 242/385.3 X |
| 5,131,594 | 7/1992 | Refior et al. . |
| 5,251,842 | 10/1993 | Zygutis et al. . |
| 5,265,823 | 11/1993 | Doty . |

SEAT BELT RETRACTOR HAVING AN INTENTIONAL SET COMFORT SYSTEM

FIELD OF THE INVENTION

The present invention relates generally to a seat belt retractor having a tension-relieving mechanism and, more particularly, to a tension-relieving mechanism that operates upon exercising predetermined seat belt protraction and retraction movements.

BACKGROUND OF THE INVENTION

A wide variety of seat belt retractors for vehicles have been developed for occupant safety. These seat belt retractors commonly comprise a reel which is biased by a spring in order to retract the seat belt against the occupant during use and to rewind the seat belt on the reel upon termination of use by the occupant. In order to retract and rewind the belt effectively, it is common for these springs to apply a relatively considerable retraction force to the reel. In some instances, however, this retraction force tends to be uncomfortable to the occupant. As a result, it desirable to provide seat belt retractors with a tension-relieving mechanism for reducing this retraction force upon the occupant.

In this connection, a number of tension-relieving mechanisms have been developed for seat belt retractors. For instance, one such tension-relieving mechanism operates automatically upon certain predetermined seat belt manipulations. In particular, it is actuated into its tensionless, comfort mode upon the user first extending the seat belt about the torso and shoulder region to secure its tongue in a latch device. Upon the act of latching the seat belt, a slight retraction of the belt occurs. This subsequent slight retraction causes an internal locking pawl to engage a ratchet wheel fixed to the reel shaft to prevent continued rewinding of the belt onto the reel under the force of the retraction spring. Thus, the occupant's shoulder region is relieved of the retraction spring force provided to rewind the seat belt. Examples of such devices are disclosed in U.S. Pat. Nos. 3,851,836, 3,869,098 and 3,834,646.

Also, some tension-relieving mechanisms include a memory system. A memory system allows the occupant to move slightly forward to protract one or two inches of the belt from the retractor without canceling the tension-relieving mechanism. For instance, if the occupant returns to his initial position following a slight forward movement, the tension-relieving mechanism remains operative to continue relieving the retraction force.

However, if the occupant maneuvers so to protract the belt more than a predetermined amount, a memory distance amount, the tension-relieving mechanism is automatically actuated to its ineffective or release position. Then, the retraction spring is allowed to retract the belt tightly against the occupant under a full retraction force.

In addition, certain mechanisms include a door operated release mechanism to assure that the seat belt is fully wound upon an occupant's departure from the vehicle. More specifically, the door operated release mechanism senses an opening of the door and, in response, actuates the tension-relieving mechanism to its inoperative position, thereby enabling the retraction spring to rewind the belt under full retraction force to its complete wound position.

Another known tension-relieving mechanisms is directed toward activation upon some conscious effort of the occupant. For instance, one device includes an occupant actuation switch to actuate the tension-relieving mechanism. In particular, the switch closes a circuit which energizes a solenoid for shifting the locking pawl into engagement with the ratchet wheel. This operation places the tension-relieving system into its tension-relieving state regardless of the amount of belt protraction. As a result, belt slack in the seat belt is not removed when the switch is actuated, even if the occupant leans backward against the seat after such actuation.

One such tension-relieving system is disclosed in U.S. Pat. No. 4,585,185, wherein this system is rendered inoperative upon a subsequent operation of the switch means. Thus, manipulation of the belt beyond a memory distance will not render automatically the tension-relieving mechanism ineffective for allowing the retraction spring to rewind the belt. This is because the solenoid has shifted the tension-relieving pawl into position, and an electrical switch operation is required to shift the solenoid for moving the pawl to its release position. U.S. Pat. No. 4,919,450 discloses the broad concept of using a manual overt actuator to shift a tension-relieving means to an activated state, and to remove belt slack such that a subsequent slight belt protraction will shift the tension-relieving means to a tensionless state. The illustrated overt actuator is a switch and solenoid or a lever and cable to shift the tension-relieving to its activated state after the occupant pushes the switch or lever.

SUMMARY OF THE INVENTION

The present invention is directed toward providing a tension-relieving system requiring the occupant to make a conscious decision to actuate the system without the use of a switch for activation, but actuates upon conscious performance of a predetermined belt manipulation sequence. Thus, when the occupant operates the seat belt retractor for securement, the tension-reliving system is not activated, but becomes activated, if desired, upon performing the predetermined belt manipulation sequence.

In addition, the present invention has the advantage of being able to remove belt slack left in the shoulder portion of the seat belt subsequent to activating the tension-relieving system. For instance, upon activation, the present system enables the retraction spring to retract belt slack prior to being actuated into its tension-relieving mode. Even further, the present invention provides a memory device to render the tension-relieving system inoperative upon belt protraction beyond a predetermined distance.

Thus, the present invention provides a tension-relieving system which includes a combination of desired features in a single mechanism. Overall, these features combine the overt actuation of the internal tension-relieving mechanism without the use of overt solenoid or lever with the ability to remove belt slack between the time initial activation and subsequent activation of the tension-relieving mode, and the ability to automatically deactivate the tension-relieving mode upon belt protraction beyond a predetermined memory distance.

Because of the high volume of vehicle production and the multiple safety belt systems, a low cost and simple system is more desirable than a complex and expensive system. The present invention not only provides new and improved functions, but is also inexpensive to manufacture and small in size, which avoids interference with existing seat belt retractor components.

Overall, the present retractor is provided with a tension-relieving mechanism which is effective, efficient, durable and cost effective to manufacture, install and operate.

The preferred intentional set comfort system of the present invention comprises primarily two major components which include a belt sensing activation mechanism and a tension-relieving mechanism. The belt sensing mechanism senses a deliberate protraction of the belt beyond a distance of normal occupant use for shifting the tension-relieving mechanism to an activated state. The normal pulling of the seat belt slightly beyond where needed to cinch the occupant will not activate the tensionless system. A protraction of substantially all of the belt on the reel is needed to activate the tensionless mechanism in its preferred embodiment. An actuator arm is employed to interconnect the belt sensing activation mechanism and the tension-relieving mechanism. In response to the belt sensing activation mechanism, the actuator arm shifts the tension-relieving mechanism to its activated state.

In particular, the belt sensing mechanism of the preferred embodiment employs a gear mechanism having a sun gear driven by the retraction spring through the reel shaft and a planet gear positioned to be rotated by the sun gear for actuating the actuator arm when the seat belt is extended to a first deliberate protraction. The planet gear is provided with a radial projection displaced axially from peripheral teeth formed on the planet gear and a plunger is slidably mounted with respect to the retractor and movable in a direction radial of the axis of rotation of the reel shaft and connected to the actuator arm. More particularly, the projection on the planet gear drives the plunger and actuator arm radially outward with respect to the axis of rotation of the reel shaft to activate the tension-relieving mechanism upon the first deliberate protraction.

While in the activated state, the retraction spring is allowed to retract the seat belt against the occupant for removing slack. More particularly, the tension-relieving mechanism includes a disc, having a plurality of grooves, mounted for rotation with the reel shaft and a spring biased blocking finger mounted for pivotal movement that is initially spaced from the disc. Upon activation of the tension-relieving mechanism, the finger is moved into the grooves and cooperates with the grooves to initially remove belt slack. That is, the first segment of each of the grooves cooperates with the first segment of each adjacent groove to allow the disc to rotate in the belt retraction direction for removing belt slack.

The tension-relieving mechanism relieves the tension force applied by the belt onto to the occupant. This mechanism is operable between a tension-relieving mode in which it blocks the retraction spring against reel retraction and seat belt rewinding and a non-tension-relieving mode in which the retraction spring is free to bias the reel to retract and to rewind the seat belt. In order to actuate the tension-relieving mode, the occupant, subsequent to removal of the belt slack, makes a slight protraction of the belt to cause the tension-relieving mode.

In particular, the subsequent belt protraction causes the finger to enter a second segment of one of the grooves. Each of the second segments includes a stop that cooperates with the finger to give the tension-relieving mode. In effect, the finger and stop prohibits the disc from rotating in the belt retraction direction thereby eliminating the force of the retraction spring.

The tension-relieving mechanism further includes a "memory" which upon subsequent protraction of the belt beyond the tension-relieving mode by a short distance, but less than a predetermined distance, allows the tension-relieving mechanism to return to the tension-relieving mode. However, belt protraction beyond the predetermined distance will result in automatic disengagement of the belt from the tension-relieving state and thereby causing reversion to the tension mode under the retraction spring force.

In particular, each of the grooves has a final third portion that cooperates with the finger to give the tension-relieving mechanism a memory mode. The memory mode has a memory distance which is measured by the length of the third portion of each groove. In addition, each groove segment terminates with means that releases the finger from the groove, and when released from the groove the spring biased finger returns to its position spaced from the disc.

BRIEF DESCRIPTION OF THE DRAWINGS

The present invention will be described in connection with the accompanying drawings, which illustrate the preferred embodiments and details of the invention, and in which.

DETAILED DESCRIPTION OF THE PREFERRED EMBODIMENT

With initial reference to FIG. 1 for a general description, the invention will be described in connection with a seat belt retractor 10 which includes a U-shaped frame 12 having spaced parallel side plates 14a and 14b interconnected by a base plate 14c. Mounted for rotation between the side plates 14a and 14b of the frame 12 is a spool or reel 16 upon which a seat belt 18 is wound. The reel 16 has a reel shaft 20 journaled for rotation about its axis in the side plates 14a and 14b. The reel 16 is also provided with a pair of ratchet wheels 22a and 22b, which are conventional in structure and form, and each includes a plurality of ratchet teeth 24 equally spaced therearound the perimeter.

The ratchet wheels 22a and 22b are a part of a ratchet mechanism 26 to prevent protraction of the seat belt 18. The ratchet mechanism 26 further comprises a lock bar or locking pawl 28, which extends between the side plates 14a and 14b, and is pivotally mounted therein with ends 30 for limited pivotal movement. The pawl 28 comprises a pair of teeth 32 that are configured with a tapered surface 34 which adapts the teeth 32 for being able to each interspersedly engage two adjacent ratchet teeth 24 of the ratchet wheels 22a and 22b located adjacent thereto. This prevents the reel 16 from rotating in the belt protraction direction.

The locking pawl 28 is biased by gravity to its disengaged position in which the pawl 28 is spaced from the ratchet wheels 22a and 22b to allow the reel 16 to rotate in the belt protraction direction. The locking pawl 28 includes a central plate portion 36. The central plate portion 36 is acted upon by gravity to bias the pawl 28 to its disengaged position and is engaged by a vehicle sensitive, inertial mechanism 38 for actuating it to its engaged position. The structure and function of the inertial mechanism 38 are intended to actuate the ratchet mechanism 26 in response to accelerations or decelerations greater than a predetermined value. That is, upon a predetermined change in acceleration or deceleration of the vehicle, the inertial mechanism 38 activates to pivot the locking pawl 28 so that each of its teeth 32 engage one of the adjacent ratchet wheels 22a and 22b to prevent protraction of the seat belt 18.

More particularly, the preferred inertial mechanism 38 is commonly a pendulum type mechanism comprising primarily of two elements, a weight 40 and a shaft 42. The weight 40 attaches to the shaft 42 at its lower end. The shaft 42 extends through an annular opening 44 located intermediately about a support 46 and terminates with an annular flange 48 adapted to rest over complementary configured annular ring 50 projecting from the support 46 to surround the annular opening 44.

In particular, the support 46 attaches to the side plates 14a and 14b through a pair of vertically extending parallel support members 52a and 52b. These support members 52a and 52b extend upward to attach to the side plates 14a and 14b at the reel shaft 20. The annular opening 44 is tapered to provide a greater opening at its lower end to allow the shaft 42 to oscillate and is located in a sloping portion 54 which slopes downward to the left of the support 46, as illustrated in FIG. 1.

The annular flange 48 and the projecting annular ring 50 cooperate with an angled pressure plate 56 suspending from the central plate portion 36 of the pawl 28 to engage a top surface 58 of the annular flange 48 to maintain the shaft 42 perpendicular to the sloping portion 54 under normal vehicle operation.

However, in periods of vehicle acceleration and deceleration greater than a predetermined value, the weight 40 responds to oscillate the shaft 42, and as a consequence, the flange 48 pivots upward to force the pressure plate 56 upward to rotate the pawl 28 so that its ratchet teeth 32 each engage both of the adjacent ratchet wheels 22a and 22b to prevent belt protraction. The structure and function of the inertial mechanism 38 are entirely conventional, and the shape and position of the inertial mechanism may be varied from that illustrated herein and also fall within the purview of this invention.

To retract the seat belt 18, a belt retraction mechanism 60 is exteriorly mounted on the right-hand side of the retractor 10 to side plate 14b of the frame 12. The belt retraction mechanism 60 comprises a housing 62 and a spring 64 mounted within the housing 62. The spring 64 attaches to the reel shaft 20 to apply a rewind force sufficient to bias the reel 16 to retract the belt 18 fully. Generally, the structure and function of this type of belt retraction mechanism are entirely conventional, and it may be mounted to either side of the retractor.

On the other side of the retractor 10, an intentional set comfort system 66 of the present invention is provided for relieving belt tension applied to the occupant by the force of the retraction spring 64. Accordingly, there are instances in which the retraction spring 64 has a tendency to apply undesirable tension on an occupant. While it is necessary for safety reasons to permit the retraction spring to remove slack from the belt and also retaining the ability to prevent belt protraction during periods of vehicle acceleration and deceleration greater than a predetermined value as described above, it would be desirable both to remove belt slack and to relieve belt tension during situations of normal vehicle operation and occupant usage.

In furtherance of this objective, the intentional set comfort system 66 of the present invention serves to remove certain belt slack and to relieve the retraction force on the belt during occupant selected periods of normal vehicle usage without interfering with the operation of an emergency locking mechanism, such as the inertial mechanism 38. More particularly, the present system 66 is directed to a system 66 which an occupant consciously activates by performing a sequence of predetermined belt manipulations, the first of which is a conscious overt act to activate the tensionless mechanism. Without this overt act to unwind substantially all of the seat belt on the reel, the tension-relieving mechanism will be ineffective. In addition, the system 66 provides a memory system in which the occupant may maneuver forward in the seat a certain distance without deactivating the system 66; however, any movement beyond this certain distance will cause the system 66 to automatically deactivate.

Figure 1:
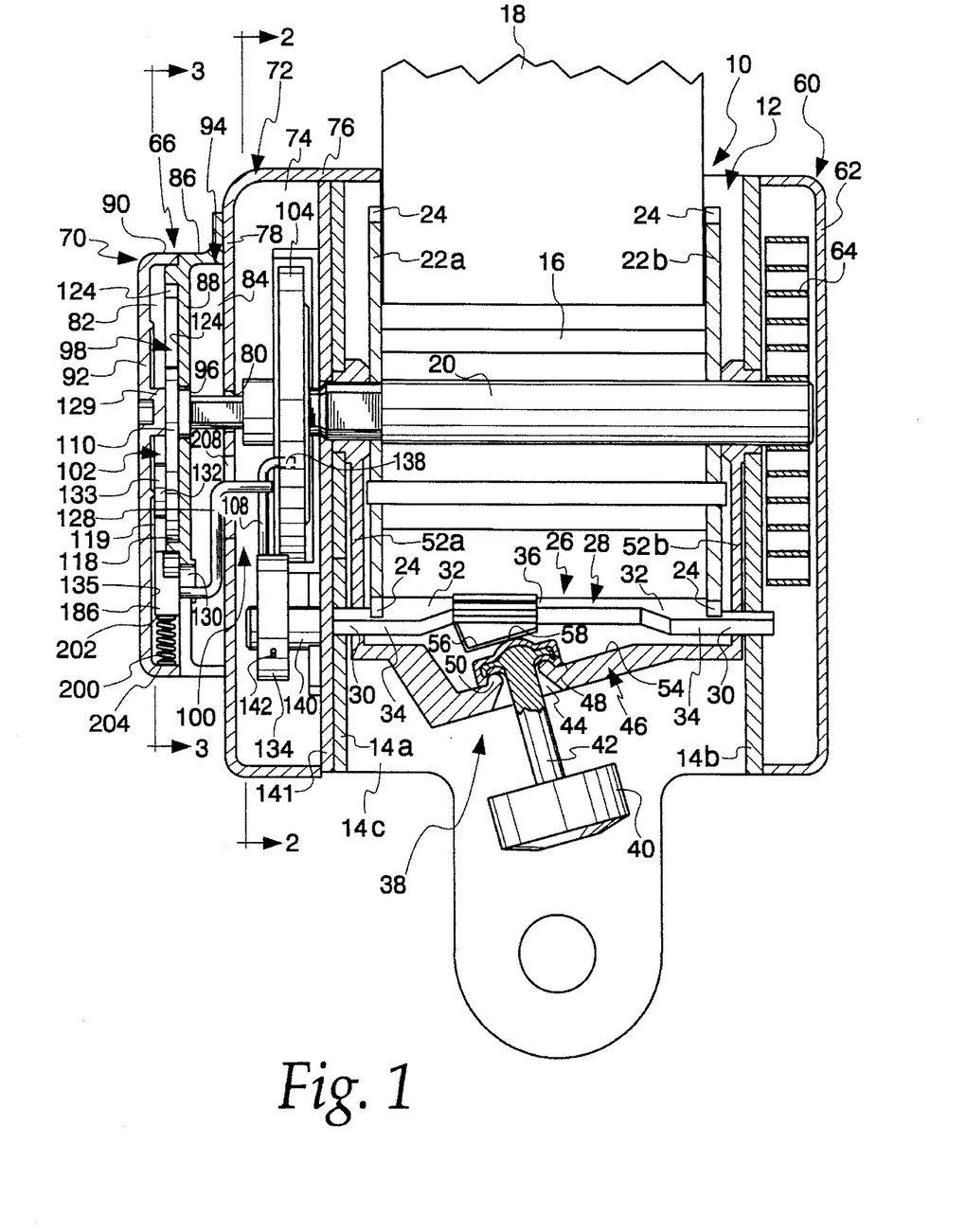
FIG. 1 is a front elevational view of a seat belt retractor embodying an intentional set comfort system of the present invention.

As shown in FIG. 1, the comfort system 66 comprises a plurality of cooperating housing members which include an outer cup-shaped housing member 70, an intermediate cup-shaped housing member 94 and an inner cup-shaped housing member 72 for housing and protecting the internal components of the system 66. The inner housing member 72 is secured to the outside surface of the side plate 14a of the frame 12. Suitable fasteners secure the inner housing member 72 against the side plate 14a thereby forming an inner chamber 74 into which the reel shaft 20 extends. The inner housing member 72 is formed with a peripheral wall portion 76 which extends contiguously to form a central wall portion 78. The central wall portion 78 is provided with several openings, one being a centrally located opening 80 through which the reel shaft 20 extends and is able to rotate therein and a second being an elongated slot 208.

The intermediate housing member 94 cooperates with both the inner housing member 72 and the outer housing member 70 to form an intermediate chamber 84 and an outer chamber 82, respectively. In particular, the intermediate chamber 84 is located between the outer chamber 82 and the inner chamber 74 and is defined by a peripheral wall portion 86 and a central wall portion 88 formed continuous therefrom and the central wall portion 78 of the inner housing member 72.

The outer chamber 82 is defined by a peripheral wall portion 90 and a central wall portion 92 formed continuous therewith and the central wall portion 88 of the intermediate housing member 94.

The intermediate housing member 94 is secured to the inner housing member 72 and the outer housing member 70 is secured to the intermediate housing member 94 to provide a small but protective housing arrangement for the components of the intentional set comfort system 66. The central wall portion 88 of the intermediate housing member 94 is provided with several openings, one being a centrally located opening 96 for allowing the shaft 20 to rotate therein and to extend for communicating with a belt sensing activation mechanism 98, and a second being an elongated slot 130 through which the actuator arm 128 extends for communicating with the belt sensing actuation mechanism 98.

The intentional set comfort system 66 of the present invention includes two major components which are the belt sensing activation mechanism 98 that is disposed primarily in the outer chamber 82 and a tension-relieving mechanism 100 that is located primarily within the inner chamber 74. For activating the system 66 in response to a predetermined belt protraction, the belt sensing activation mechanism 98, as best seen in FIGS. 3 and 4, comprises a planetary gear mechanism 102 in connection with the shaft 20 for sensing belt movements and the actuator arm 128 for activating the tension-relieving mechanism 100 in response to a predetermined protraction of the seat belt 18 from the reel 16 that is beyond that of normal occupant usage.

The tension-relieving mechanism 100 is arranged to be activated in response to the planetary gear mechanism 102 by the actuator arm 128. The mechanism 100 includes a comfort cam disc 104 fixed for rotation with the reel shaft 20 and having a plurality of grooves 106 (FIG. 2) to cooperatively receive, when activated, a block-out finger 138 of a needle 108. The finger 138 cooperates with the groove 106 in which it travels to operate against the retraction spring 64 through the comfort cam disc 104 and the reel shaft 20 to relieve the retraction force.

Figure 3:
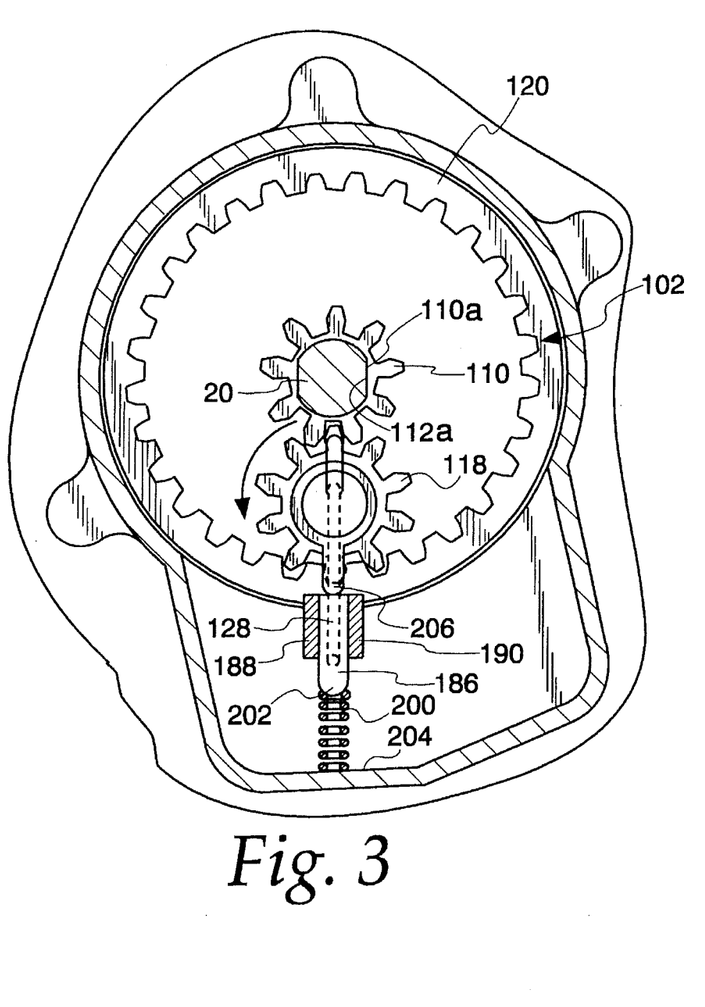
FIG. 3 is an enlarged, cross-sectional view of the intentional set comfort system taken along line 3—3 of FIG. 1 to illustrate a first activation operation of the system.
Figure 4:
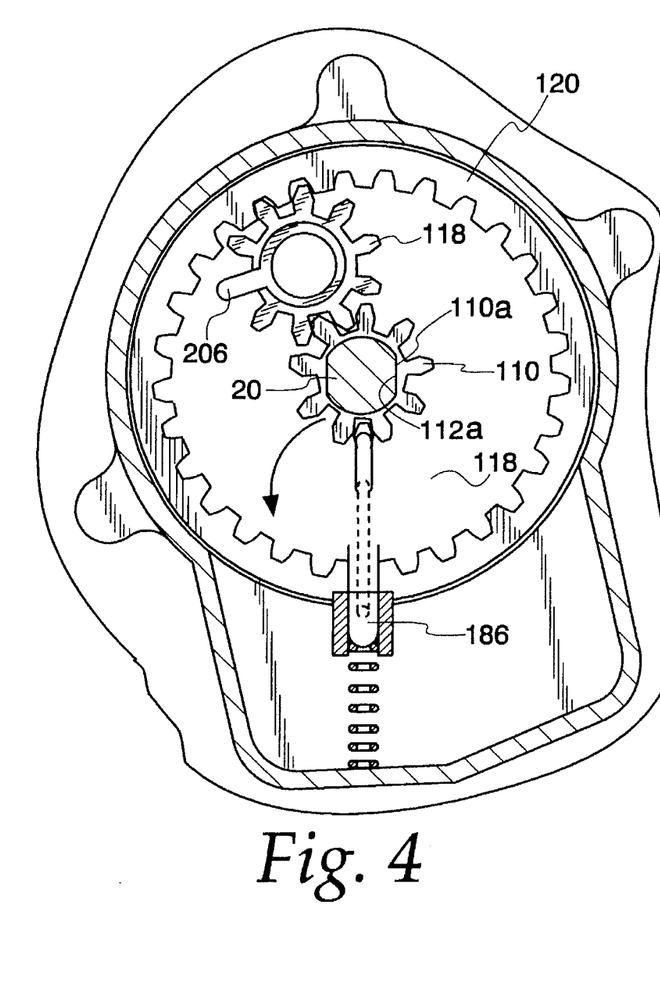
FIG. 4 is an enlarged, cross-sectional view of the intentional set comfort system taken along line 3—3 of FIG. 1 to illustrate a second activation operation of the system.
Figure 10:
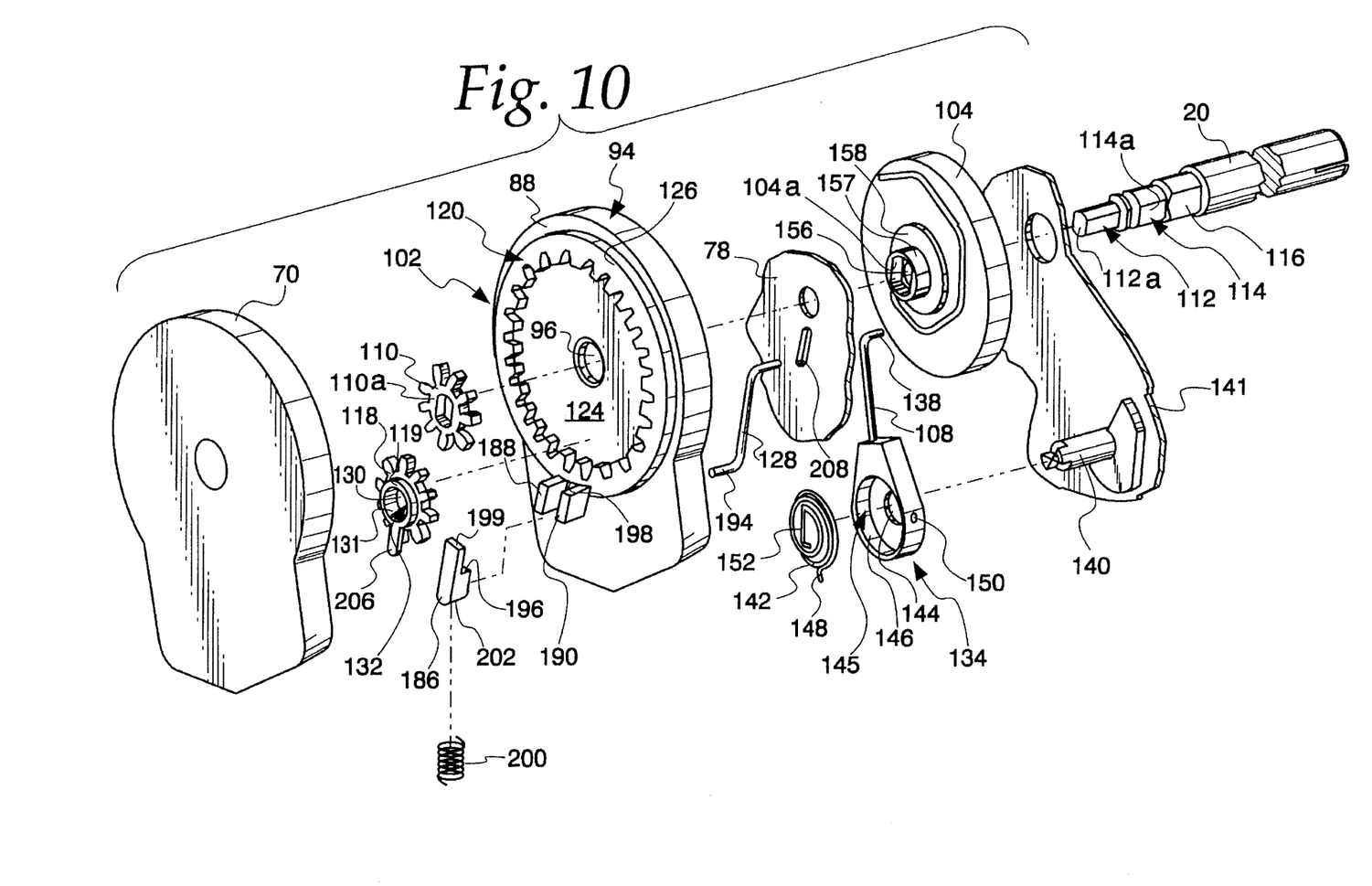
FIG. 10 is an exploded perspective view of the assembly of the intentional set comfort system of the present invention.

As illustrated in FIGS. 3, 4 and 10, the planetary gear mechanism 102 includes a sun gear 110, which is secured to the outer end of the real shaft 20. Accordingly, the end of the reel shaft 20 is formed with a plurality of reduced diameter portions 112, 114 and 116 adapted to engage and enable the sun gear 110, the comfort cam disc 104 and the ratchet wheel 22a (FIG. 1), respectively, to rotate with the reel shaft 20 in response to the retraction spring 64 (FIG. 1).

In particular, the end portion 112 extends through the opening 96 of the center wall portion 88 of the intermediate housing member 94 and flat surfaces 110a on the sun gear 110 engages the flat surfaces 112a on the reel shaft 20 for rotation by the retraction spring 64. The planetary gear mechanism 102 further includes a planet gear 118 which includes teeth that complementarily engage teeth of the sun gear 110 to be driven thereby. The teeth of the planet gear 118 also engage teeth of a fixed internal gear 120, which is formed integrally from the central wall portion 88 of the intermediate housing member 94.

The internal gear 120 comprises an inner surface 124 and an annular ring 126 projecting outward from the central wall portion 88 of the intermediate housing member 94 and, therefore, within the outer chamber 82 (FIG. 1). Thus, the planet gear 118, which is driven by the sun gear 110, cooperates with the internal gear 120 to rotate around in the outer chamber 82 inside the annular ring 126 upon the surface 124 as the reel shaft 20 rotates under the bias of the retraction spring 64.

As best illustrated in FIG. 1, the sun gear 110 and the planet gear 118 are confined between the central wall portion 92 of the outer housing member 70 and the inner surface 124 of the central wall portion 88 of the intermediate housing member 94 which forms the internal gear 120. The central wall portion of the outer housing member 70 includes a centrally located circular stub 129 which projects inward into the outer chamber 82 to engage the sun gear 110 for maintaining its engagement with the shaft 20 and the surface 124 of the intermediate housing member 94. The planet gear 118 includes an aperture 130 (FIG. 10) surrounded by an annular ring 132 projecting from the gear 118 and having a planar surface 119 for engaging and travelling along a thread-like annular ring 133 projecting into the outer chamber 82 from an inner surface 135 of the central wall portion 92 of the outer housing member 70. In particular, the ring 133 defines the orbital path traveled by the center portion of the planet gear 118. This maintains the planet gear 118 against the inner surface 124 of the central wall portion 88 of the intermediate housing member 94 and in proper engagement with the sun gear 110 and the internal gear 120. Further, by maintaining a relatively intimate relationship between the sun gear 110, the planet gear 118 and the internal gear 120 within the outer chamber 82, any potential for rattling among these components is reduced.

As mentioned above, the tension-relieving mechanism 100 is located in the inner chamber 74 and includes the comfort cam disc 104 and a spring biased arm mechanism 134 having the tension-relieving needle 108 with the finger 138 formed at its end. The arm mechanism 134 is actuated to cooperate with the cam disc 104 to provide the tension relief from the retraction spring 64, to provide memory distance and to automatically terminate the tension-relieving mode upon a predetermined belt protraction which exceeds the memory distance. For moving the needle 108 between a tension-relieving mode (FIG. 5) and non-tension-relieving mode (FIG. 7), the spring biased arm 134 is rotatably mounted on a post 140 extending from a base plate 141, which mounts to side plate 14a, into the inner chamber 74. The arm 134 includes a centrally located mounting aperture 144 to receive the post 140 for rotating thereabout. A helical spring 142 biases the arm 134 counter-clockwise, as viewed in FIG. 7 to its inactive position.

Turning now to FIG. 10, the spring 142 is located in an circular recess 144, centrally located on, and defined by a sidewall 146 of the spring biased arm 134, and includes the turntable post 140 extending therethrough. For mounting the spring 142 to create a biasing effect, a first spring end 148 is adapted to extend through a small aperture 150 formed in the sidewall 146 for fixing this end 148 for rotation with the spring biased arm 134, and a second spring end 152 is configured to extend through an aperture (not shown) formed through the free end of the post 140 for fixing this end 152 against movement to create the biasing force. The arm 134 is able to pivot in the vertical direction slightly for movement between the tension-relieving mode and the non-tension-relieving mode. The post 140, aperture 144 and spring 142 cooperate to support the arm 134 in a manner allowing the arm 134 to pivot in the vertical direction. The pivoting effect allows the finger 138 to fall into the grooves 106 for activation of the tension-relieving mechanism 100 and for release from the grooves 106 for deactivating the tension-relieving mechanism 100.

The comfort cam disc 104 includes a centrally located mounting aperture 156 adapted to receive one of the reel shaft's reduced diameter portions 114 having flats 114a, which are complementarily configured to engage flats 104a on the disc 104 to assure the disc rotates with the shaft. For maintaining the non-tension-relieving mode, the disc 104 includes a shelf 158, preferably an integral, plastic washer which is mounted about an annular flange 157 projecting perpendicularly from the disc 104, surrounding the aperture 156 upon which the needle 108 travels when in the non-tension-relieving mode.

Figure 2:
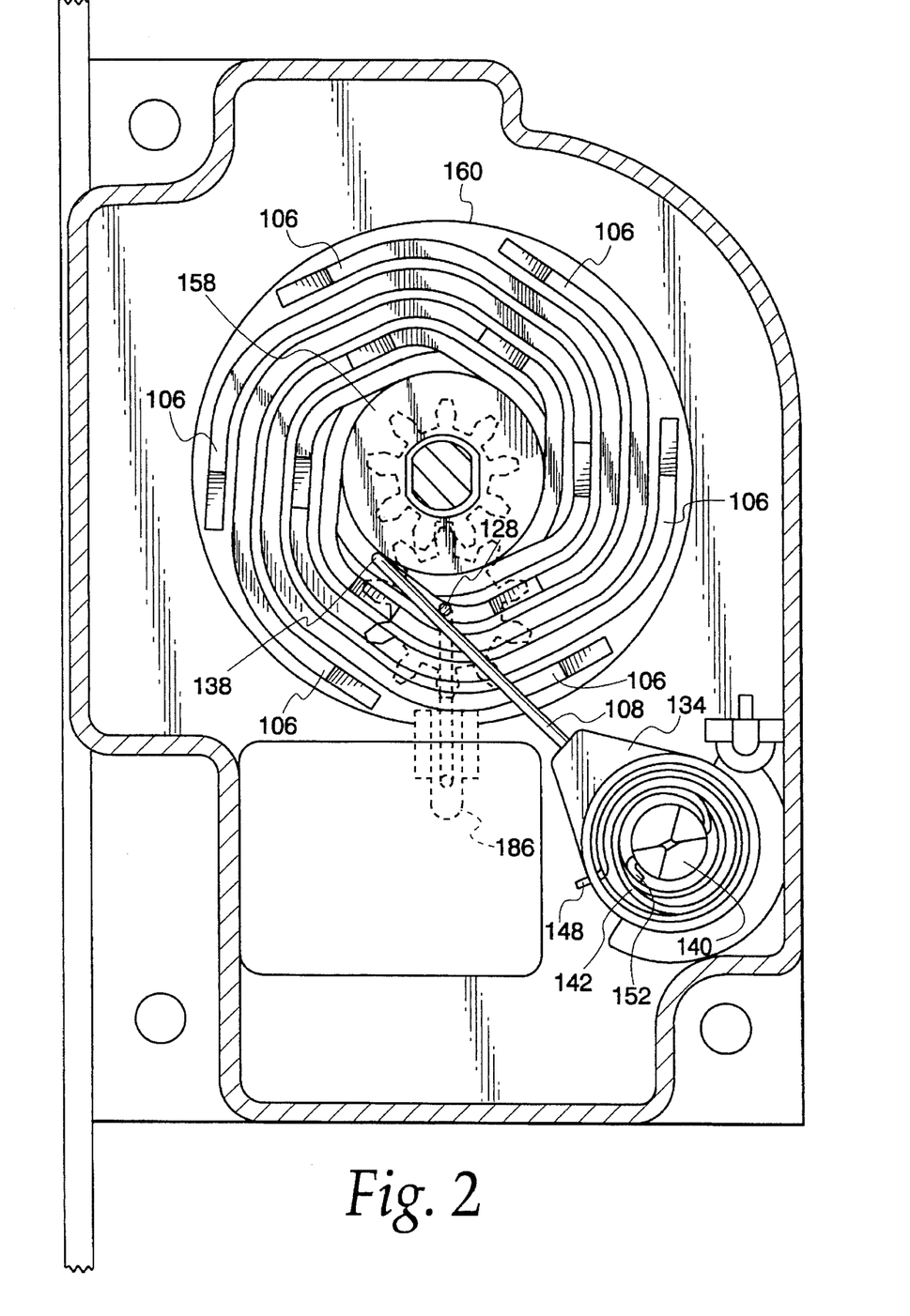
FIG. 2 is an enlarged, cross-sectional view of the intentional set comfort system taken along line 2—2 of FIG. 1.

As best illustrated in FIG. 2, the disc 104 includes the plurality of equally spaced grooves 106, preferably five (5) in number in which the finger 138 of the needle 108 may travel. The groove 106 provides the comfort system 66 with a predetermined memory distance allowing the belt 18 to be protracted a predetermined distance without deactivating the tension-relieving mode. However, once the belt is protracted beyond the memory distance, the comfort system 66 is automatically switched to its non-tension-relieving mode where the finger 138 is discharged from the groove 106 in which it is presently travelling. Once discharged, the bias of the arm 134 swings the needle 108 so that the finger 138 then rides on the shelf 158.

Figures 7, 8:
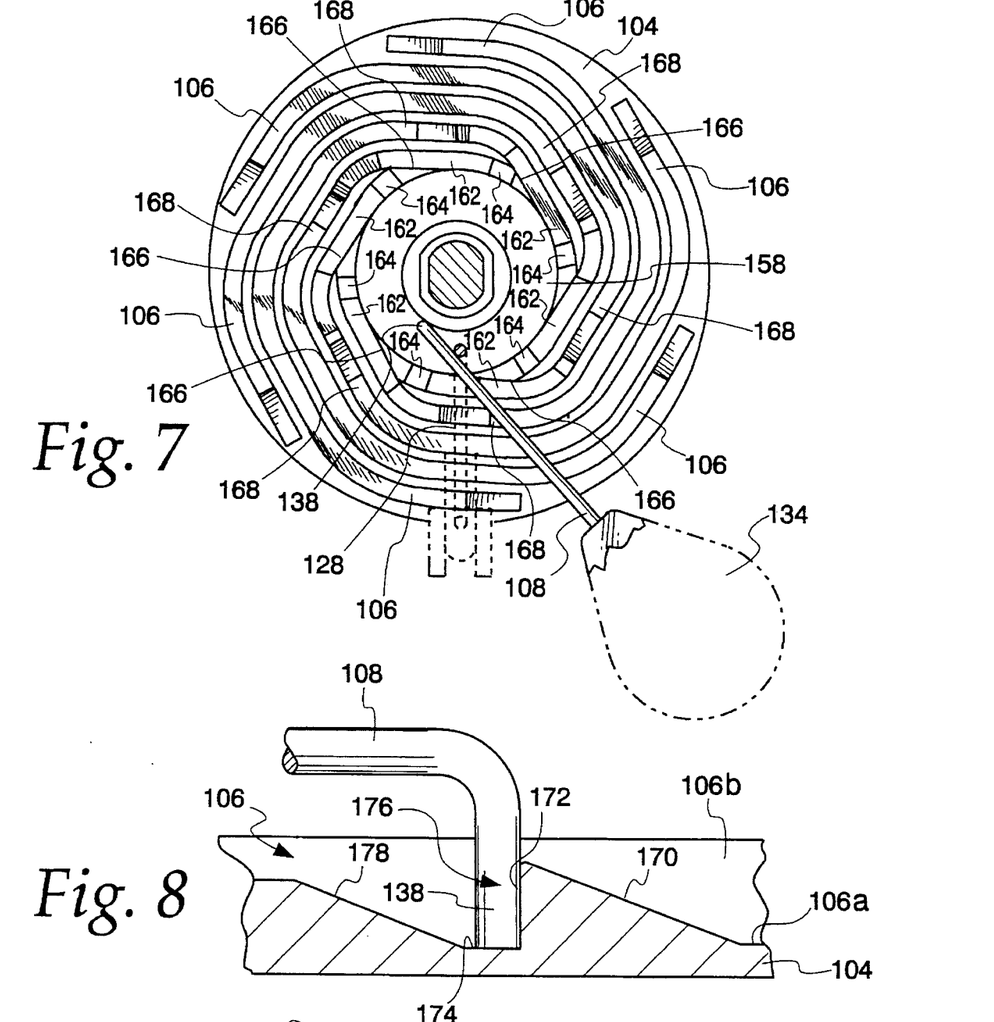
FIG. 7 is an elevational view depicting the comfort cam and block-out finger of the intentional set comfort system operating in a non-tension-relieving mode.
FIG. 8 as an enlarged cross-sectional view of the comfort cam and block-out finger taken along line 8—8 of FIG. 5 to illustrate the operation of the tension-relieving mode.

Turning now to FIG. 7, each groove 106 has a substantially involute configuration comprising a plurality of segments. Further, each groove 106 is of the same length and begins adjacent the shelf 158 and spirals outward to terminate adjacent an outer edge 160 of the disc 104. The grooves 106 are each identically provided with a bottom surface 106a located between a pair of upstanding groove walls 106b that prevent the finger 138 of the needle 108 from skipping between grooves 106. The width of the groove is sufficient to allow the finger 138 to travel freely in the groove. As the finger 138 travels in one of the grooves 106, the needle 108 pivots the arm 134 about the post 140. Further, as the finger 138 shifts between the shelf 158 and the grooves 106, the arm 134 pivots in the vertical direction slightly for raising and lowering the finger 138 between the shelf 158 and the grooves 106.

Once the arm 134 is actuated off the shelf 158 by the actuator arm 128, a first groove segment 162 of each groove 106 cooperates with its adjacent counterpart to form a substantially circular inner groove path for enabling take up of belt slack. This circular groove path allows the finger 138 of the needle 108 to travel unobstructively in the belt retraction direction, as the disc 104 rotates in a counter-clockwise direction, with respect to FIG. 7, in response to the retraction spring 64 (FIG. 1). In particular, the first segment 162 of each groove 106, with reference to rotation in the belt protraction direction, terminates with an upward retraction ramp 164 that terminates with a downward retraction step 166 leading into the first groove segment 162 of an adjacent groove 106. Thus, the retraction ramp 164 and step 166 of each first groove segment cooperates with the adjacent first groove segment in sequence to allow the finger 138 to travel in a substantially circular path for enabling belt retraction to take-up belt slack.

Figure 5:
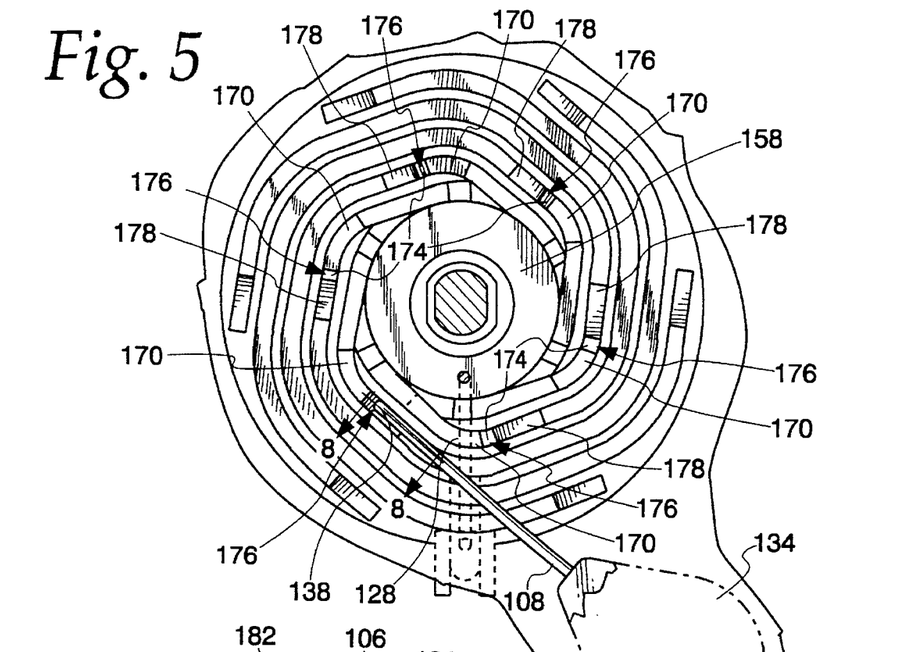
FIG. 5 is an elevational view depicting the comfort cam and block-out finger of the intentional set comfort system operating in a tension-relieving position.

After the desired belt slack is removed, the tension-relieving mode may be activated upon a subsequent predetermined slight belt protraction. This belt protraction causes the finger 138 and the downward retraction step 166 of one of the first groove segments 162 to actuate the tension-relieving mode. That is, the wall of the retraction step 166 forces the finger 138 into a second segment 168 of one of the grooves 106. With reference to FIGS. 5 and 8, each of the second groove segments 168 originates with a finger stop 176 actuated by an upward sloping actuating ramp 170, with reference to the belt protraction direction (clockwise FIG. 5), terminating with a downward step having a step wall 172. Following each of the ramps 170, there is a slight recess 174 forming a stop for the finger 138 to prevent belt retraction. Each recess 174 is followed by stop exit ramp 178 to allow the finger 138 to travel into the memory portion of the groove 106. In particular, each of the recesses 174 is provided with greater depth than the grooves 106 in general and therefore requires the stop exit ramp 178 for enabling the finger to move into the memory portion of the groove 106. Thus, in the tension-relieving mode, the finger 138 is received in the recess 174 and abuts the stop wall 172 to prevent the disc 104 from rotating in the counter-clockwise direction to prevent belt retraction. In effect, the reel 20 is prevented from rotating in the belt retraction direction, and as a result, the retraction spring 64 is rendered ineffective.

The remaining segments of each groove 106, between the stop 176 and the disc edge 160, provides a tension-relieving memory mode for allowing belt protraction beyond the stop 176 by a predetermined amount, a memory distance, in which the system 66 is able to return to the tension-relieving mode. The memory distance enables an occupant to maneuver forward and backward in the seat a predetermined distance without deactivating the tension-relieving mode. Moreover, since the grooves 106 are of same length, each occupant, irregardless of size, is provided with the same memory distance.

In effect, the memory mode enables the finger 138 of the needle 108 to travel outward in the groove 106 upon belt protraction less than the memory distance and to travel inward back to the stop 176 to resume its tension-relieving position upon subsequent belt retraction. However, belt protraction beyond the memory distance automatically actuates the needle 108 to its non-tension-reliving position, where the finger 138 is discharged from the particular groove 106 in which it is traveling to rest on the shelf 158.

Figure 6:
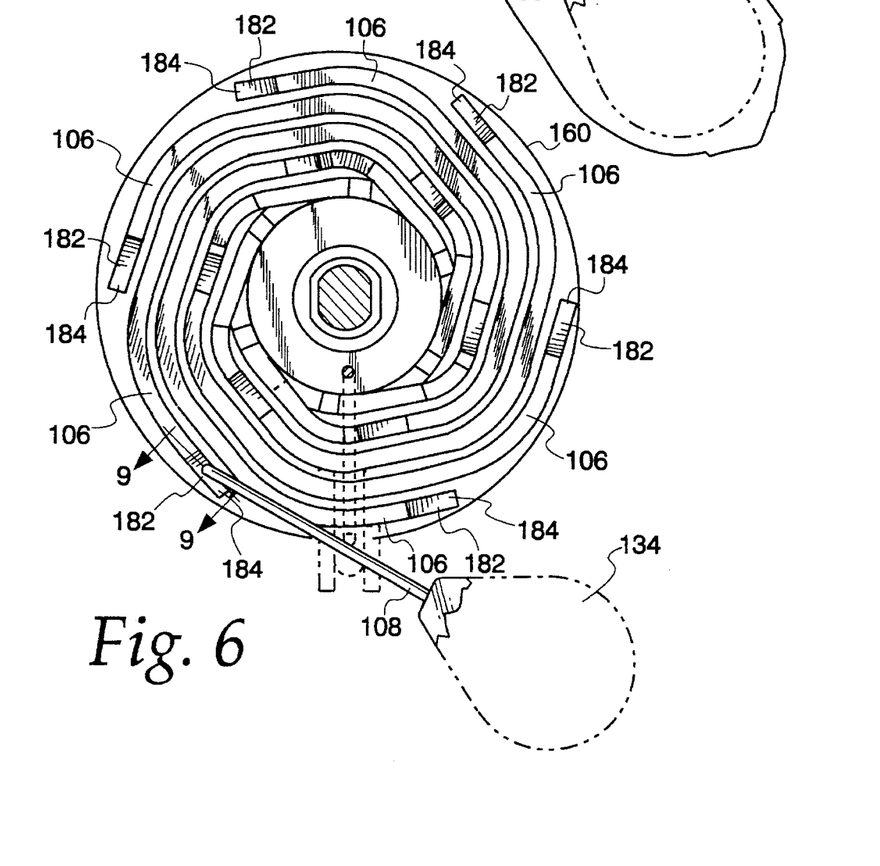
FIG. 6 is an elevational view depicting the comfort cam and block-out finger of the intentional set comfort system operating in a tension-relieving memory mode.
Figure 9:
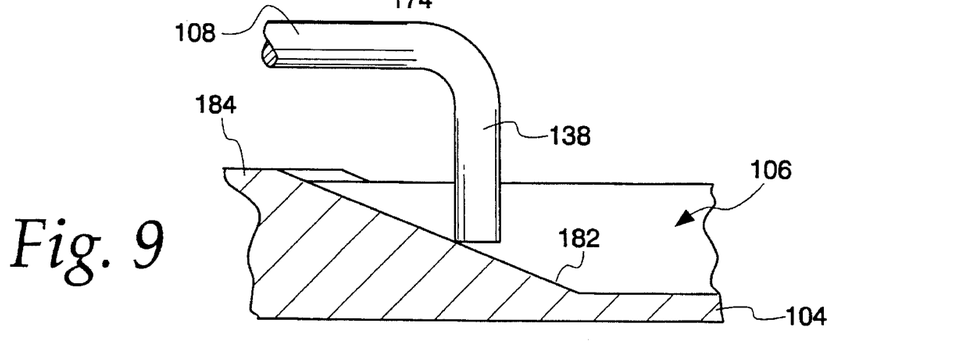
FIG. 9 is an enlarged cross-sectional view of the comfort cam and block-out finger taken along line 9—9 of FIG. 6 to illustrate the operation of the tension-relieving memory mode immediately prior to automatic termination of the intentional set comfort system.

As best illustrated in FIGS. 6 and 9, each of the grooves 106 terminates at the disc edge 160 with an upward sloping deactivation ramp 182, with reference to the belt protraction direction (clockwise FIG. 6), for automatically deactivating the tension-relieving mechanism 100.

More specifically, the deactivation ramp slopes upward to terminate with a flat surface 184. The flat surface 184 is elevated above the grooves 106 of the disc 104 at a sufficiently predetermined height that enables the arm 134, under the bias of its spring 142, to pivot upward and to rotate the needle 108 and its stop hook 138 back to the shelf 158 for the non-tension-relieving mode.

Returning to FIG. 1, the purpose of the planetary gear mechanism 102 is to activate the tension-relieving mechanism 100 in response to the protraction of a predetermined length of seat belt 18. In accordance with this objective, the planetary gear mechanism 102 is connected to the reel shaft 20 being driven by the retraction spring 64.

For the purpose of interconnecting the planetary gear mechanism 102 to the tension-relieving mechanism 100, there is included within the outer chamber 82 an actuating plunger 186 for selectively actuating the actuator arm 128 to pull the needle 108 to place the finger 138 in the grooves 106.

As illustrated in FIG. 10, the plunger 186 is mounted between a pair of guide walls 188 and 190, formed integrally with the central wall portion 88 of the intermediate housing member 94. The guide walls 188 and 190 direct the plunger 186 for rectilinear travel about the central wall portion 88 of the intermediate housing member 94 along a line which is perpendicular to the axis of rotation of the sun gear 110 and the reel shaft 20.

The central wall portion 88 of the intermediate housing member 94 is formed with an elongated slot 130 (FIG. 1) located between the guide walls 188 and 190 through which the actuator arm 128 extends for activating the tension-relieving mechanism 100 in response to the belt sensing gear mechanism 102. The actuator arm 128 has a first end 194 which attaches to the plunger 186. The slot 130 and the first end 194 cooperate to limit the extent of downward rectilinear sliding movement of the plunger 186. That is, the first end 194 abuts the lower edge of the slot 130. To limit upward rectilinear sliding movement, the plunger 186 includes a stop 196 on its underside which may abut an outer surface 198 of the internal gear 120. The plunger 186 includes a flat end 199 which is adapted to be engaged by the planet gear 118 for actuating the arm 128 to activate the tension-relieving mechanism 100. The central wall portion 92 of the outer housing member 70 may slidably engage the upper side of the plunger 186 to prevent its outward displacement from between its guide walls 188 and 190, as best illustrated in FIG. 1.

The plunger 186 is spring-loaded with a return spring 200 (FIG. 1), to return the plunger 186 to its reference position. In particular, the plunger 186 includes a second end 202 which is located opposite the flat end 198 and is adapted to engage the spring 200. The spring 200 is located between the second end 202 and an inner surface 204 of the peripheral wall portion 90 of the outer housing member 70. In effect, once the planetary gear 118 ceases operating upon the plunger 186 (FIG. 3), the spring 200 biases the plunger 186 back to its reference position (FIG. 4) in which it is poised to again be operated upon by the planetary gear 118.

As illustrated by FIGS. 3, 4, 10, the planetary gear 118 is formed with a projection 206 which is aligned to engage the flat end 198 of the plunger 186 and urge it downward when the projection 206 becomes aligned with the plunger 186 when the belt 18 is protracted beyond a normal usage amount. The projection 206 is elevated above the internal gear 120 and is disposed radially outward from the planet gear 118 so that the projection 206 does not interfere with the teeth on the internal gear 120 and the sun gear 110.

In its initial reference position, the plunger 186 is extending inwardly over the internal gear 120 toward the sun gear 110 under the bias of the return spring 200, as shown in FIG. 4. As belt protraction occurs, the reel shaft 20 rotates the sun gear 110 clockwise, which in turn rotates the planet gear 118 counter-clockwise to move it around clockwise along the internal gear 120. At this time, the finger 138 is riding on the shelf 158 of the tension-relieving mechanism 100, because the comfort cam disc 104 is also rotating clockwise with the reel shaft 20.

Upon full protraction of the seat belt 18, the planet gear 118, with its projection 206, arrives at the position shown in FIG. 3. In this position, the projection 206 of the planet gear 118 forces the plunger 186 downward between the guide walls 188 and 190. This downward movement of the plunger 186 draws the arm 128 downward (FIG. 2) to activate the tension-relieving mechanism 100. In particular, the arm 128 has an S-shaped configuration for extending from the plunger 186 through the slot 130 into the intermediate chamber 84. In order to activate the tension-relieving mechanism, the actuator arm 128 extends through an elongated slot 208 in the central wall portion 78 of the inner housing member 72 to enter into the inner chamber 74 to engage and actuate the needle 108 to move the finger 138 from the shelf 158 into the first groove segments 162 of the grooves 106 of the comfort cam disc 104. As described supra, the belt slack may then be removed and subsequent protraction of the belt actuates the tension-relieving mode.

In operation, the seat belt retractor 10 initially is with the seat belt 18 fully would therein. The occupant then protracts the seat belt 18 from the retractor 10 to extend across the body and latches it for securement. At this time the tension-relieving mechanism 100 is inoperative; however, during the above protraction of the belt 18, the belt sensing activation mechanism 98, through its planetary gear mechanism 102, has measured the amount of belt 18 protraction for subsequent activation of the tension-relieving mechanism 100.

More particularly, to activate the tension-relieving mechanism 100, the occupant must consciously extend the belt 18 fully from the retractor 10. This causes the reel shaft 20 to rotate the sun gear 110 clockwise for rotating the planet gear 118 counterclockwise to in effect revolve it clockwise about the internal gear 120, as illustrated in FIG. 4. When the belt 18 is fully protracted, the projection 206 of the planet gear 118 engages and forces the actuating plunger 186 downward between the guide walls 188 and 190, as illustrated in FIG. 3. The downward movement of the plunger 186 draws the actuator arm 128 downward therewith to draw the needle 108, which is biased inward toward the reel shaft 20 by the spring 142 of the arm 134, away from the reel shaft 20. More particularly, the draw of the needle 108 causes the finger 138 to be dragged off the shelf 158 and into the first groove segment 162 of one of the grooves 106.

Once the tension-relieving mechanism 100 is activated, the occupant may allow the belt 18 to be retracted under the force of the retraction spring 64 to take-up any belt 18 slack. To set the tension-relieving mechanism 100 in tension-relieving mode after the desired belt 18 slack is removed, the occupant makes a conscious slight protraction of a predetermined amount of the belt 18 to cause the finger 138 to cam along the step wall 166 (FIG. 7) and over the actuating ramp 170 to move into the second segment 168 of one of the grooves 106. Any further retraction of the belt 18 now is prohibited as a result of the finger 138 resting in the recess 174 and abutting the step wall 172 of the actuating ramp 170, as illustrated in FIGS. 5 and 8. In effect, the finger 138 of the needle 108 prevents the comfort cam disc 104 from rotating in the belt retraction direction and thereby eliminates the retraction spring force applied to the belt 18 by the retraction spring 64.

While in the tension-relieving mode, the occupant is free to protract the belt 18 a predetermined distance, such as through forward movements, without switching the tension-relieving mechanism 100 to its inoperative position. This predetermined distance is referred to as a memory distance and is represented by the length of each of the grooves 106. However, any protraction beyond this memory distance automatically causes the tension-relieving mechanism 100 to deactivate. That is, when the belt 18 is protracted the finger 138 moves in the groove 106 toward the outer edge 160 of the disc 104, and when the belt 18 is protracted so that the finger 138 travels beyond the memory distance, the finger 138 travels up the deactivation ramp 182 to rest on the flat surface 184, as illustrated in FIGS. 6 and 9. Once on the flat surface 184, the finger 138 is pivoted by the spring 142 of the arm 134 back to ride on the shelf 158. Thus, to activate the tension-relieving mechanism 100 and shift it to its tension-relieving mode again, the occupant must repeat the above indicated belt maneuvers.

Thus, it is apparent that there has been provided, in accordance with the invention, a seat belt retractor with an intentional set comfort system that fully satisfies the objects, aims and advantages set forth above. While the invention has been described in conjunction with a specific embodiment, it is evident that many alternatives, modifications and variations will be apparent to those skilled in the art in light of the foregoing descriptions.

What is claimed is:

1. A vehicle seat belt retractor for rewinding a seat belt comprising:

a frame;

a reel mounted for rotation in the frame;

a biasing means for biasing the reel to retract and to rewind the seat belt on the reel;

an emergency locking means for locking the reel upon a predetermined deceleration of the vehicle to prevent belt protraction;

a tension-relieving means for relieving a tension force applied by the belt onto an occupant, the tension-relieving means operable between a tension-relieving position in which it blocks the biasing means against reel retraction and seat belt rewinding and non-tension-relieving position in which the biasing means biases the reel to retract and to rewind the seat belt;

measuring means for measuring the belt protraction for a predetermined, fixed distance substantially beyond normal occupant use protraction and for shifting the tension-relieving means to an activated state in response to said measured predetermined fixed distance for conscious activation of the the activated state of the tension-relieving and for means allowing the biasing means to retract the seat belt against the occupant;

means for shifting the tension-relieving means to the tension-relieving position upon a first predetermined seat belt protraction occurring subsequent to the tension-relieving means being shifted to its activated state; and means for shifting the tension-relieving means to the non-tension-relieving position upon belt protraction beyond a second predetermined amount.

2. A seat belt retractor in accordance with claim 1 wherein the tension-relieving means comprises a disc mounted for rotation with the reel and having a plurality of grooves and a blocking finger that cooperates with the grooves to initially allow rotation of the reel to remove belt slack and, upon slight belt protraction subsequent to being activated, prevents the disc and the attached reel from rotating in the retraction direction thereby relieving tension applied by the biasing means.

3. A seat belt retractor in accordance with claim 2 wherein each of the grooves has substantially the same length and includes a first segment which cooperates with the first segment of the adjacent groove to allow the disc to rotate in the belt retraction direction for removing belt slack and a second segment having a stop to cooperate with the blocking finger to prevent reel rotation in the retraction direction.

4. A seat belt retractor in accordance with claim 3 herein each of the grooves has a third groove segment in which the blocking finger travels to give the tension-relieving mechanism a memory mode for allowing slight belt protraction less than the second predetermined amount for enabling the tension-relieving means to return to its tension-relieving position.

5. A seat belt retractor in accordance with claim 4 wherein the means for shifting the tension-relieving means to the non-tension relieving position comprises a cam located in the third groove segment of each groove for camming the blocking finger to the non-tension relieving position by causing the finger to be released from the groove.

6. A vehicle seat belt retractor for rewinding a seat belt comprising:

a frame;

a reel mounted for rotation in the frame;

a biasing means for biasing the reel to retract and to rewind the seat belt on the reel;

an emergency locking means for locking the reel upon a predetermined deceleration of the vehicle to prevent belt protraction;

a tension-relieving means for relieving a tension force applied by the belt onto an occupant, the tension-relieving means operable between a tension-relieving position in which it blocks the biasing means against reel retraction and seat belt rewinding and non-tension-relieving position in which the biasing means biases the reel to retract and to rewind the seat belt;

means for sensing a deliberate protraction of the seat belt a distance substantially beyond normal occupant use and for shifting the tension-relieving means to an activated state in response to the deliberate protraction for conscious activation of the activated state, the activated state of the tension-relieving means allowing the biasing means to retract the seat belt against the occupant;

means for shifting the tension-relieving means to the tension-relieving position upon a first predetermined seat belt protraction occurring subsequent to the tension-relieving means being shifted to its activated state; and means for shifting the tension-relieving means to the non-tension-relieving position upon belt protraction beyond a second predetermined amount, the belt sensing and shifting means including a gear mechanism driven by the reel and an actuator arm for actuating the tension-relieving means to the activated state in response to the deliberate protraction of the seat belt beyond the distance of normal occupant use.

7. A seat belt retractor in accordance with claim 6 wherein the gear mechanism comprises a sun gear driven by the biasing means and a planet gear positioned to be rotated by the sun gear for actuating the actuator arm when the seat belt is deliberately protracted beyond the distance of normal occupant use.

8. A seat belt retractor in accordance with claim 7 wherein the planet gear comprises a plurality of peripheral teeth formed on the planet gear and a radial projection displaced axially from the peripheral teeth and further comprises a plunger slidably mounted with respect to the retractor and movable in a direction radial of the axis of rotation of the reel and connected to the actuator arm and where the projection on the planet gear drives the plunger and the actuator arm radially outward with respect to the axis of rotation of the reel to activate the tension-relieving mechanism in response to the deliberate protraction of the seat belt beyond the distance of normal occupant usage.

* * * * *